US006414746B1

United States Patent
Stettner et al.

(10) Patent No.: US 6,414,746 B1
(45) Date of Patent: Jul. 2, 2002

(54) 3-D IMAGING MULTIPLE TARGET LASER RADAR

(75) Inventors: Roger Stettner; Howard W. Bailey, both of Santa Barbara, CA (US)

(73) Assignee: Advanced Scientific Concepts, Inc., Santa Barbara, CA (US)

( * ) Notice: Subject to any disclaimer, the term of this patent is extended or adjusted under 35 U.S.C. 154(b) by 0 days.

(21) Appl. No.: 09/449,091

(22) Filed: Nov. 24, 1999

(51) Int. Cl.$^7$ ............................................. G01C 03/08
(52) U.S. Cl. ..................................... 356/4.01; 250/332
(58) Field of Search ......................... 356/4.01; 250/332

(56) References Cited

U.S. PATENT DOCUMENTS

| | | | | |
|---|---|---|---|---|
| 4,652,766 A | * | 3/1987 | Wang et al. ................. 250/578 |
| 4,862,257 A | * | 8/1989 | Ulich ........................... 358/95 |
| 5,101,108 A | * | 3/1992 | Gaalema et al. ............ 250/332 |
| 5,446,529 A | * | 8/1995 | Stettner et al. ............ 356/4.01 |

* cited by examiner

*Primary Examiner*—Mark Hellner
(74) *Attorney, Agent, or Firm*—Gottlieb, Rackman & Reisman, P.C.

(57) ABSTRACT

A three dimensional imaging device is presented which uses a single pulse from a pulsed light source to detect objects which are obscured by camouflage, fog or smoke but otherwise enveloped by a light-transmitting medium. The device simultaneously operates in two modes, light reflected from the nearest object is processed to form a three-dimensional image by an array of pixels. This first image is based upon the light-pulse transit time recorded in each pixel. Each pixel also contains a high-speed analog memory that sequentially stores reflected signals at a repeated time interval. The first reflection acts as a time base that controls when the analog memory begins or ends the storage sequence. The first return could be from a camouflage net and the amplitudes of the return signals, after the first return, would then be from objects behind the net. Computer processing these amplitudes reveals the three-dimensional nature of the obscured objects.

The device consists of the pulsed light source, optics for collecting the reflected light, a sensor for detecting the light and converting it to electrical data, drive and output electronics for timing and signal conditioning of data generated by the sensors and a computer for processing the sensor data and converting it to a three dimensional image. The sensor collects and processes the light data in a unique manner, first converting it to electricity by a number of alternate detector technologies and then using integrated circuit chips which consist of a two dimensional array of electronic pixels also called unit cells. The two dimensional array defines two dimensions of the image. Stored within each unit cells is data associated with the third dimension, ranges of targets, and amplitudes of target reflections. This data is read out of the integrated circuit chip in the time interval between laser pulses to a processing computer. The processing computer corrects the data and, by means of computer algorithms specific to the device, converts the data to a three-dimensional image of one or more targets. This image may be viewed or processed electronically to isolate targets.

106 Claims, 4 Drawing Sheets

3-D IMAGING MULTIPLE TARGET LASER RADAR

FIELD OF THE INVENTION

This invention relates to a laser radar vision apparatus capable of producing three-dimensional images of distant targets located behind reflective or absorbing but penetrable barriers such as camouflage and obscuring smoke. In particular, this invention relates to a multiple pixel, electronic apparatus for capturing three-dimensional images of distant targets, within obscurants, at high-spatial and high-range resolution in the atmosphere or in space with a single laser pulse, using a laser-reflection generated trigger.

BACKGROUND OF THE INVENTION

This application is a continuation-in-part of U.S. patent application Ser. No. 08/665,738, Filed Jun. 19, 1995, 3D Now U.S. Pat. No. 6,133,989 which is a CIP of Ser. No. 08/015,623, Now U.S. Pat. No. 5,446,529 Imaging Laser Radar. Laser radars (ladars) determine range in the atmosphere by measuring the transit time of a laser pulse from the transmitter/receiver to a partially or fully reflective target and dividing by twice the velocity of light in the atmospheric medium. If there are more than one return pulse, only the first return pulse is used in the range processing. Range resolution in such devices is related to the accuracy of the transit time measurement. In the atmosphere, ranges are typically measured in kilometers, where range resolution can be smaller than 30 cm. A 3-D target image can be obtained with a conventional laser radar by rastering the laser beam across the target and measuring the transit time, pulse by pulse, where each pulse corresponds to a point on the target. The distance between points on the target determines the spatial resolution of the rastered image and defines the picture element (pixel) size; the number of pixels at the target determines the pixel-array size; the range resolution determines resolution in the third target dimension. Rastering is a slow process, particularly for large pixel-array sizes, and it requires cumbersome mechanical scanners and complex pixel-registration computer processing. In addition, if the first laser-pulse return is from a partially reflective obscurant, which is hiding the target, then the 3-D image does not reveal the nature of the real target.

U.S. patent application Ser. No. 08/665,738, Filed Jun. 19, 1995, by the present inventors disclosed a lightweight, small-size, multiplexing laser radar receiver, the LR-FPA, that could image an entire target, in the atmosphere or in space, at high-spatial and high-range resolution with a single laser pulse. Thus the necessity of laser rastering or using a multitude of laser pulses to obtain a three-dimensional image is avoided. The reflected laser pulse, from different portions of an object, stop independent clocks located in a two-dimensional array of pixels. The times at which the clocks are stopped are related to the third dimension of the object by the velocity of light and are stored in the pixels along with peak signal data. The time data and peak signal data is read out from the array between laser pulses and used to construct the three-dimensional image. Processing the peak signal amplitude with the time data increases the range resolution accuracy. More than one reflected pulse for each pixel is accommodated by separately storing the return time and peak signal of each reflection.

U.S. Pat. No. 5,446,529, issued Aug. 29, 1995 to the present inventors discloses a lightweight, multiplexing laser radar receiver (3DI-UDAR) that can generate a three-dimensional image of an entire object, in a light conducting medium, such as water or the atmosphere, with a single laser pulse. The imaging is accomplished by integrating and storing the reflected signals from a multitude of range resolution intervals (range bins), independently for each of a two-dimensional array of pixels; each range bin across the two-dimensional array corresponds to a range slice in three dimensions. After reading the range bin data out between laser pulses, the time of laser pulse returned from the object is determined for each range bin in the two dimensional array, by means of the integration clock and the start of integration. The three-dimensional image is constructed by the knowledge of the return time of each two-dimensional slice. Because there is return pulse amplitude information as a function of time rather than just the peak of the return pulse, more information can be derived concerning the character of the target. The first range bin begins storing information in response to a signal from the invention's drive electronics rather than from an external signal such as the first reflection from the light conducting medium (the surface of the water for example).

There is only a finite storage capacity for each of the pixels (typically 30 to 200 storage bins) in the 3DI-UDAR. For high spatial resolution in a medium that does not attenuate the light appreciably, the effective depth from which the information is coming from is only a small proportion of the entire range. For example, for 30 cm range resolution, 200 storage bins may only correspond to a depth of 60 m whereas the absolute range or the ladar may be many tens of kilometers. Turning on the range bin integration at the optimum range position (the target position) could involve a trial and error process requiring more than one laser pulse or another system which first finds the time delay to the target and then transfers that time delay to the drive electronics.

BRIEF DESCRIPTION OF THE PRESENT INVENTION

In the present invention a reflected laser pulse from one or more targets, or from an obscured target are integrated and stored in a sequence of range bins, independently for each of a two-dimensional array of pixels. The range bin integrations are turned on automatically, including a possible programmed delay, as the first reflection arrives at the receiver of the invention. Alternatively the integrations are occurring continuously, with the storage bins being filled by new data until the first reflection arrives. Storage then proceeds until a predetermined but adjustable number of storage bins are filled allowing the option of obtaining data prior to the first reflection and/or after it to be stored. By processing this data, preferably between laser pulses, one or more three-dimensional images of single or multiple targets or targets within obscurants can be generated.

A preferred embodiment of the sensor of the invention is a hybrid of two chips, an array of detectors (or collectors) directly connected to an array of processing-electronics unit cells. Each detector/collector, on one chip, is connected to its own processing-electronics unit cell, on the other chip, and defines a pixel in the image. Each processing-electronics unit cell, on the array, contains an identical and unique integrated circuit which can store the first reflected-pulse transit time, the first reflected peak amplitude and/or a sequence of range bins which contain amplitude information about the first reflected pulse and subsequent reflected pulses or amplitude information only about subsequent reflected pulses. Transit-time and pulse amplitude information for all pixels is read out preferably between laser pulses. Laser photons interact directly with the detector array generating a signal or laser photons are converted to electrons that then generate the signal in different embodiments of the invention.

It is the object of the present invention to provide a device for three dimensional imaging of obscured or unobscured objects using a single laser pulse, in transparent or semi-transparent media by a sequence of measurements on the returned pulse amplitude and to overcome the problems of prior systems associated with the need for first determining the range of the target. The device comprises a pulsed light source, means for projecting the light towards the object, optics for collecting the reflected light, improved sensors for detecting the reflected light, drive and output electronics for timing and signal conditioning of data from the sensors and a computer and software for converting the sensor data to a three dimensional image.

It is further the object of the present invention to provide improved sensors which detect and store laser-pulse, target-reflected, transit-time and/or target-reflected laser pulse amplitude information on a processing-electronics unit cell array from which the ranges and 3-D shape of multiple targets or obscured targets can be accurately determined.

Other objects of the invention will be disclosed in the detailed description or the preferred embodiments that follow and from the claims at the end of this disclosure.

DETAILED DESCRIPTION OF A PREFERRED EMBODIMENT OF THE INVENTION

Figure 1:
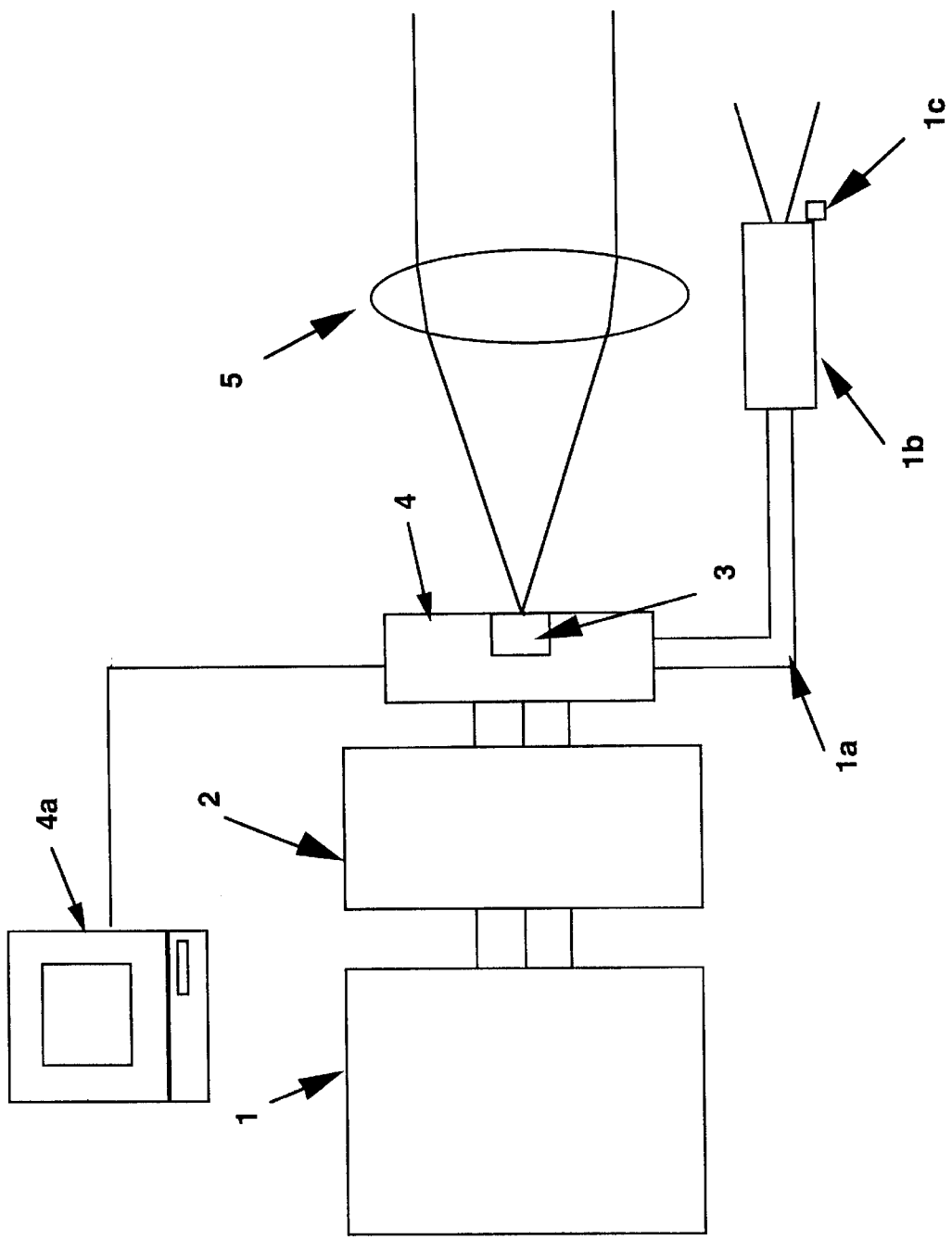
FIG. 1 is a side view of the preferred embodiment of the Laser Radar Focal Plane Array Imaging System.

A preferred embodiment of the present invention, the Penetrating 3-D Ladar (PDAR) imaging system depicted in FIG. 1, is designed to produce three-dimensional image data (area and range) from a single laser pulse reflected from objects in the atmosphere, located in or behind obscurants, using transit time and/or amplitude information, and process the data to form a three dimensional image. Six parts make up the preferred embodiment of the invention; a pulsed laser 1, with delivery system 1a, collimator 1b and laser transmission detector 1c; the data processing and laser control system 2; the sensor 3, and associated Drive and Output Electronics 4, and the optics 5. The Drive and Output Electronics 4 is electrically connected to an image processing computer 4a.

Figure 2:
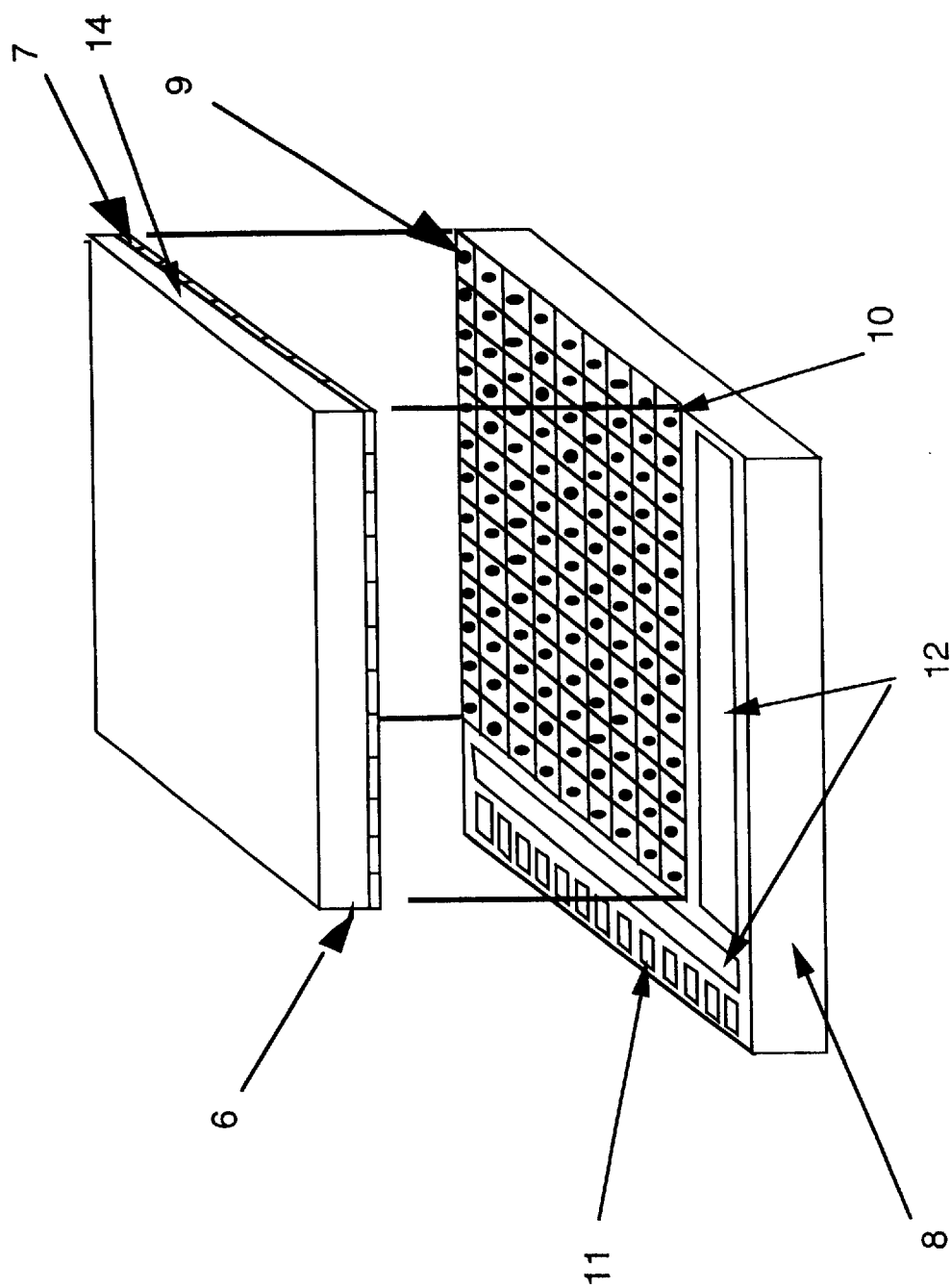
FIG. 2 is a perspective view of the hybrid sensor of the present invention.

FIG. 2 shows one sensor design 3, a hybrid sensor, in greater detail. It consists of a detector array chip 6, composed of individual detectors 7, the laser radar processor chip 8, and conducting bumps 9, which electrically connect each detector 7 to a single, corresponding, laser radar processor processing-electronics unit cell 10. Wire bond pads 11 electrically connect the hybrid sensor 3 to the drive and output electronics 4 multiplexing and chip output amplifier circuitry 12 connect the processing-electronics unit cell circuitry 10 with the wire bond pads 11. A bump pad fabricated with the last metal layer on the processing-electronics unit cell circuitry connects the metal bump 9 to the processing-electronics unit cell circuitry 10. In the hybrid sensor 3, laser light interacts directly with the detectors which are solid state devices that are responsive to the particular laser wavelength. The detectors are made on a solid-state substrate 14. The detector size can be 1 $\mu$m to 500 $\mu$m on a side. The array size can be 1×1 to greater than 1024×1024. Typically the chips are a few centimeters square. The solid state substrate 14 may or may not have lenses etched into it. These lenses allow the detector size and noise to be reduced while maintaining the same collection area. In an alternate design a lens array is placed above the detector array 6 rather than etch lenses into the detector substrate 14.

For intense photon sources the detector array chip 6 may be combined with the laser radar processor chip 8 in a monolithic design. In this configuration a small detector 7 would be incorporated in the laser radar processor processing-electronics unit cell 10 and no metal bumps would be necessary.

Figure 3:
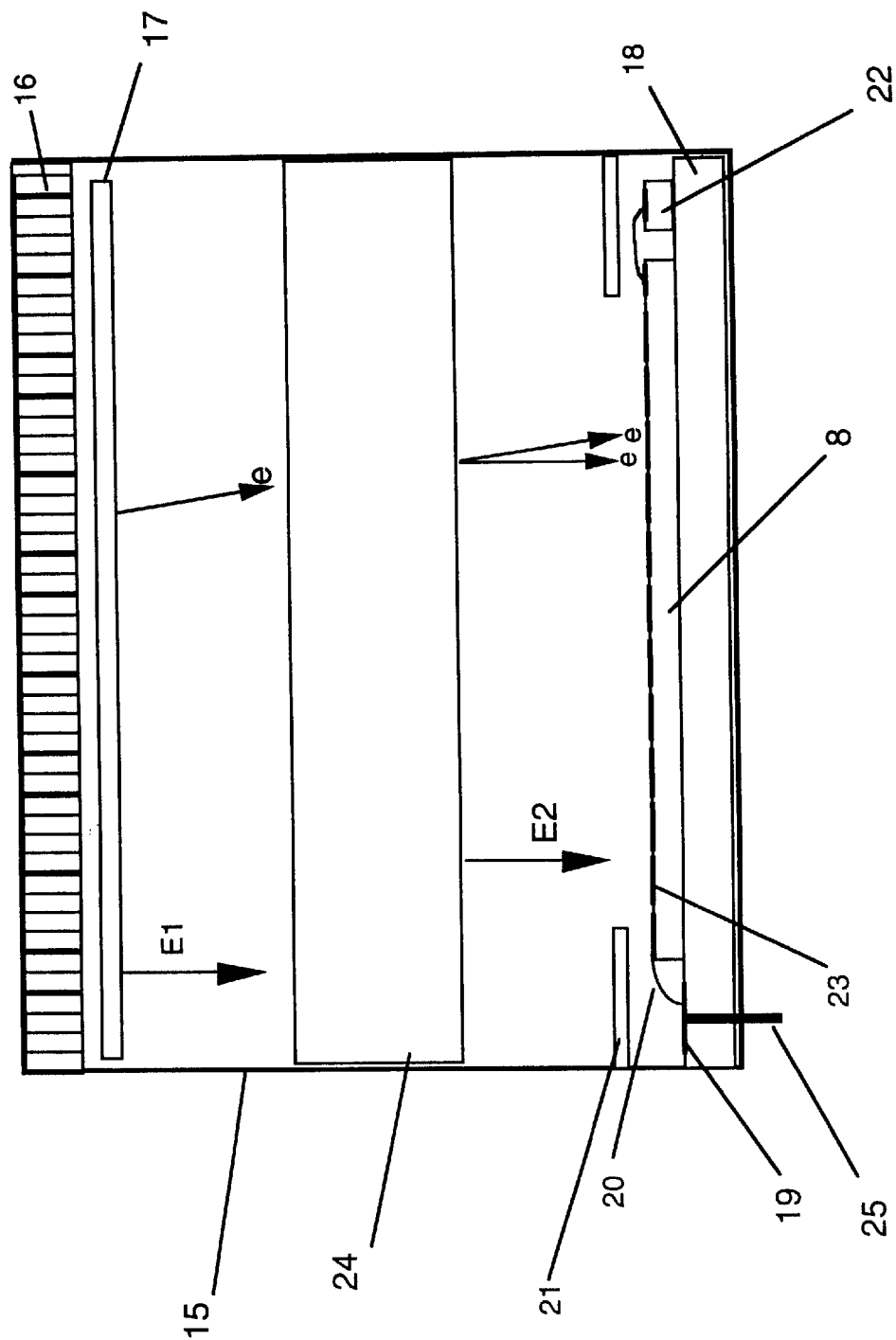
FIG. 3 is a side view of the vacuum tube sensor of the present invention.

FIG. 3 shows an alternate sensor design, the vacuum tube sensor 3, where the anodes 23 of an anode array are fabricated using the last layer of metal on the laser radar processor chip 8 and enclosed in a vacuum tube 15. This design eliminates all conducting bumps 9 since the anodes 23 are part of the processing-electronics unit cells 10. An electron amplifier 24, typically one or more microchannel plates, is positioned between the photocathode and anode 23 array.

In an alternate design the anodes 23 are fabricated as a separate chip, an anode array chip. Metal pads on top of a substrate, typically ceramic, comprise the anode array chip; the anodes 23 collect electrons and pass the electrical signals through metal vias in the ceramic substrate to conducting bumps 9 at the underside of the anode array chip. Contact to the conducting bump 9 is made at the metal via on the bottom of the anode array chip substrate.

The vacuum tube may contains a transparent window 16 to transfer the laser light to a photocathode 17, where the laser light is converted to photoelectrons. The window 16 may be optical glass, a fiber optics plate or sapphire. A voltage between the photocathode and the electron amplifier 24 generates an electric field, E1, in the tube to accelerate photoelectrons into the electron amplifier 24. A voltage between the electron amplifier 24 and the anode array generates an electric field, E2, in the tube to accelerate electrons amplified in the electron amplifier 24 into the anodes 23 of the anode array. The laser radar processor chip 8 is mounted on a ceramic chip carrier 18 which contains wire bond pads 19 that communicate with the drive and output electronics 4 (FIG. 1) and laser radar processor chip 8 by means of wires 20 and pins 25. Some high-speed clocks may not be generated on the drive electronics 4 but may be generated on the laser radar processor chip 8 or on a special clock chip 22 located inside the tube 15 on the header 18. The vacuum tube 15 may also contain guard rings or electrons shields 21 at the same potential as the detector array. Typically the FIG. 3 sensor is few centimeters in all three dimensions.

In an alternate design the electron amplifier 24 may not be present. A detector array chip 6, may replace the anode array chip, bump bonded to the laser radar processor chip 8, and enclosed in a vacuum tube 15. In this alternate design a voltage between the detector array 6 and the photocathode 17 accelerates electrons into the detector array 6.

In an alternate sensor 3 design, the FIG. 3 sensor may be placed in a magnetic field oriented perpendicular to the photocathode 17.

Figure 4:
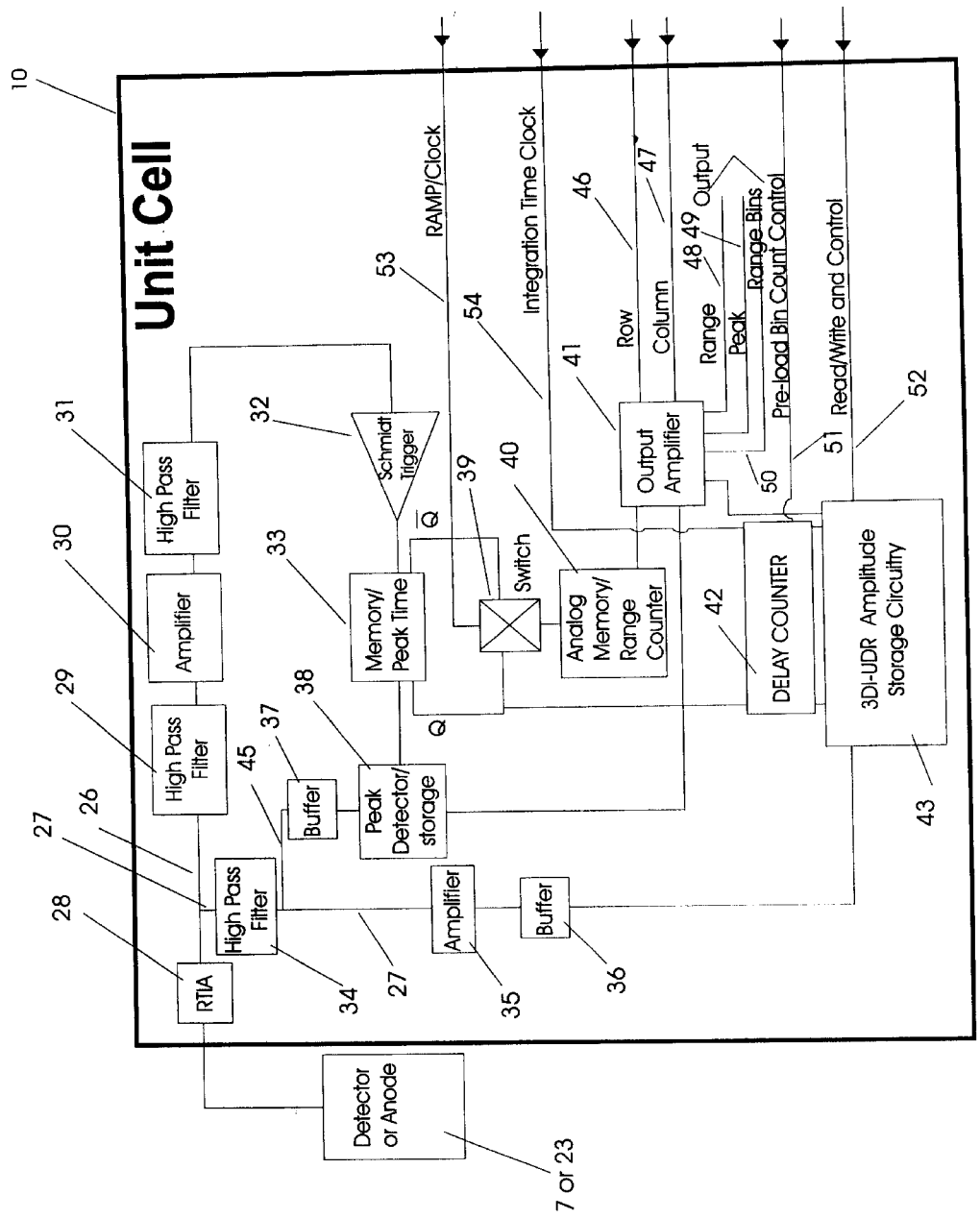
FIG. 4 is a block diagram of the unit cell processing-electronics of the present invention.

FIG. 4 shows a block diagram of the preferred processing-electronics unit cell circuitry 10. An anode 23 or a detector 7 is electrically connected to the processing-electronics unit cell circuitry 10, directly to a Resistive Trans-impedance Amplifier (RTIA) 28. The voltage output from the RTIA 28 is separated into two legs, one leg, the time-of-first-return (TFR) leg 26 is associated with processing and storing the return time of the first laser reflection and the other leg, amplitude-of-return (AR) leg 27 is associated with processing and storing all the return amplitudes of reflected laser pulses. The first component in both legs is a high pass filter 29 and 34. In practice this component is usually combined with the next component in the processing sequence to save chip real estate. The amplitude-of-first-return (AFR) leg 45 separates from the AR leg 27 after the high pass filter 34. The AR leg 27 is then connected to a voltage amplifier 35, then a buffer 36 and then to the 3DI-UDAR amplitude-storage circuitry 43. The AFR leg 45 connects the high pass filter 34 to the peak detector and storage circuitry 38, though a buffer 37.

The high pass filter 29 on the TFR leg 26 is connected to a voltage amplifier 30, to another high pass filter 31, to a Schmitt Trigger and then to a Memory 33. The Memory 33 is connected to the Peak Detector and Storage Circuitry 38. The Memory 33 is also connected so it can open the Switch 39. A ramp voltage or clock pulse line 53, from the drive and output electronics 4, pass thorough the Switch 39 to either an Analog Memory or a Pulse Counter 40. In alternate designs the ramp voltage or clock pulses are generated on the laser radar processor chip 8 or on a contiguous chip 22. The Memory 33 is also connected to a delay counter 42 which is connected to the 3DI-UDAR Amplitude Storage Circuitry 43.

All data storage circuitry, the Peak Detector/Storage 38, the Analog Memory/Pulse Counter 40 and the 3DI-UDAR Amplitude Storage Circuitry 43 is connected to the Output Amplifier 41. The Output Amplifier 41 is connected to the drive portion of the drive and output electronics 4 by the row line 46 and the column line 47. The output amplifier 41 is connected to the output portion of the drive and output electronics 4 by the first-return range line 48, the first-return amplitude peak line 49 and the range bin line 50. The delay counter 42 is connected to the drive and output electronics 4 by the bin count control 51 line and the 3DI-UDAR amplitude storage circuitry 43 is connected to the electronics 4 by the Read/Write and control line 52.

The PDAR imaging system functions as follows. A pulsed laser 1 (FIG. 1) emits a laser pulse, via a delivery system 1a and collimator 1b, towards a target. A laser transmission detector 1c gates on the ramp voltage or clock located within the output and drive electronics 4. The collimator is designed so that the laser pulse illuminates all or a large part of the target area and not just one point. Laser light reflected from one or more targets is captured by the optics 5 and focused on the sensor 3. Light absorbed by the detectors 7 (sensor in FIG. 2 only) of the detector array 6 are converted to electrons and holes and each is conducted by detector internal fields to opposite sides of the detector substrate 14. Charges that conduct to the bottom of the substrate 14 are conducted through the conducting bump 9, as electric currents, to laser radar processor processing-electronics unit cells 10 corresponding to the detectors 7 that absorbed the laser photons.

For intense reflected signals or where the size of the laser radar processor processing-electronics unit cell 10 is large, a monolithic design can incorporate a small detector 7 into in the laser radar processor processing-electronics unit cell 10. Under these circumstances the detector current flows directly into the processing-electronics unit cell circuitry 10.

Under the circumstances that a lens has been etched into the detector substrate 14, or a lens array has been placed above the detector array 6, light is collected by these lenses and focused onto the detector 7 region producing electric currents in the detectors 7 of a larger magnitude than would occur without the lenses, increasing signal-to-noise ratio.

Under the circumstances that the detector 7 is actually a solid-state amplification detector, such as an avalanche diode, the electric current generated in the detector is larger than for an ordinary detector, increasing signal-to-noise ratio.

If the FIG. 3 vacuum tube sensor 3, with the electron amplifier 24, is employed with the PDAR imaging system depicted in FIG. 1, as before, laser light reflected from the target is captured by the optics 5 and focused on the sensor 3. Laser photons are transferred by the window 16 to the photocathode 17 where the laser light is converted to photoelectrons. If the vacuum tube sensor 3, does not have a fiber optic window, light is focused, though the window 16 on the photocathode 17 itself. The field E1 accelerates the photoelectrons into the top of the electron amplifier 24. A voltage across the electron amplifier 24 causes multiplication of the photoelectrons in the electron amplifier 24. The field E2 accelerates the electrons from the bottom of the electron amplifier 24 to the anodes 23. The electron current is transferred from the anodes 23 to their associated laser radar processor processing-electronics unit cells 10. If the FIG. 3 vacuum tube sensor 3 does not contain an electron amplifier 24 but does contain anodes 23 the transfer of photons to electric current in the processing-electronics unit cells 10 is essentially the same except there is no amplification. The anode 23 array is fabricated from the last metal layer of the laser radar processor chip 8 or is a separate chip mechanically and electrically connected to the laser radar processor chip 8. The electron amplifier 24, is typically one or more microchannel plates.

An alternate-design FIG. 3 vacuum tube sensor 3 does not contain an amplifier 24 nor an anode 23 array. Instead the anode is a two-chip hybrid, a detector array 6 mechanically and electrically connected to the laser radar processor chip 8 as depicted in FIG. 2. The hybrid replaces the laser radar processor chip 8 in FIG. 3. In this case the photoelectrons are accelerated by an electric field between the photocathode 17 and the anode, into the detector array 6, where the signal is amplified. Amplification results because it requires about three times the bandgap of the detector solid state material, or typically about 3 eV, to create an electron-hole pair and the potential drop between the photocathode 17 and the detector array is usually one or more keV. Although some energy is lost in penetrating into the active area of the detectors 7, the energy that remains will create multiple electron-hole pairs for each photoelectron and hence amplification. Charges that conduct to the bottom of the substrate 14 are conducted through the conducting bump 9 as an electric current to laser radar processor processing-electronics unit cells 10 corresponding to the detectors 7 that absorbed the photoelectrons.

All the FIG. 3 vacuum tube sensors 3 can be used in a magnetic field oriented perpendicular to the photocathode 17. The magnetic field increases the spatial resolution of the invention by preventing lateral translation of photoelectrons emitted with velocity components parallel to the photocathode. The electrons spin around a magnetic field line in their transit to the detector array 6.

The detector or anode currents are processed by the laser radar processor processing-electronics unit cell circuitry 10, for all sensors 3 as follows. Detector currents are input to the RTIA 28 and converted to a voltage. The voltage output from the RTIA is separated into two legs, the TFR leg 26 and the AR leg 27. The first component in both legs is a high pass filter 29 or 34. The high pass filters 29 and 34 are important to reduce noise and increase signal-to-noise ratio. 1/f noise is largest at low frequency and thermal noise is flat in frequency space. Noise reduction and signal distortion are traded off in this component.

The purpose of the TFR leg 26 is to measure the time, and hence the range, of the first return and to provide controlling input to the AR leg 27. Range is measured by turning off the switch 39 when the voltage amplitude from the RTIA 28, or equivalently the input current amplitude, is high enough. The voltage from the RTIA is filtered 29, amplified 30 and filtered 31 again. All filtering reduces noise and increases signal-to-noise ratio. The voltage signal then enters a Schmitt Trigger 32 which provides positive feedback for saturation to occur rapidly and therefore produces sharp rise times. Amplification and pulse shaping (and noise reducing filtering) is required to obtain a large enough, fast rising signal to trip the Memory 33 (typically a flip-flop with amplification) and open the Switch 39.

The switch 39 is connected to an Analog Memory (typically a capacitor) or a Range Counter (typically a modified high-speed shift register) 40 in two alternative designs. The ramp voltage or a clock pulses pass through the Switch 39 via line 53 and this signal is terminated when the Switch 39 is opened by the first laser pulse return. The voltage on the capacitor is converted to time by knowledge of the ramp characteristics or the number of counts on the counter is directly related to time and this time determines the range of the first return via multiplication by the velocity of light.

The Memory 33 is triggered at the peak of the laser pulse for the weakest signal. Since it is not uncommon to have target reflection coefficients vary by an order of magnitude or more on the same target at the same range, the memory in different pixels could be triggered at the peak of the pulse in one pixel and near the beginning of the pulse in the second pixel. Thus if there were no amplitude correction processing (correcting for the measurable fact that a large amplitude laser pulse triggers the Memory 33 closer to the beginning of the laser pulse than a smaller amplitude laser pulse), the uncertainty in range would be the pulse rise time. Amplitude correction for range is necessary for very accurate first-return range calculations for each pixel. The time of first return in each pixel is the basis for determining the times of all other returns. The time at which the Memory 33 changes state, relative to the beginning of a given laser pulse shape, can be measured as a function of pulse amplitude. By knowledge of this function and by knowledge of the amplitude of the reflected laser pulse, all transit times and hence all ranges can be corrected for laser pulse amplitude.

The purpose of the AR leg 27 is two fold. One branch, the AFR leg 45, processes the RTIA 28 signal voltage to determine a peak signal for the first return so that the range to the first-return object can be determined with high accuracy. The primary AR leg 27 carries the RTIA 28 signal voltage to the 3DI-UDAR Amplitude Storage Circuitry 43 where succeeding return signals can be stored. If the scenario timing is such that the first return signal can be stored in the 3DI-UDAR Amplitude Storage Circuitry 43 then the Peak Detector/Storage 38 can be eliminated. Alternatively if, in practice, the laser pulse rise time is short enough, or the range accuracy requirement is not too severe, it may also be possible to eliminate the Peak Detector/Storage 38. The Peak Detector/Storage 38 contains timing circuitry that shuts it off, at a specific time, after the Memory 33 is triggered so that other returns or reflections do not modify the peak signal. In one design the Peak Detector/Storage 38 is a typical Peak Detector with a storage capacitor. The Peak Detector could be made with just four CMOS transistors for example: The input is on the gate of one transistor with the storage capacitor at the source. The two other transistors act as switches to reset the gate and the storage capacitor each cycle.

In an alternate design the Peak Detector/Storage 38 is similar to the 3DI-UDAR Amplitude Storage Circuitry 43. In this latter Peak Detector/Storage 38 design, signal amplitude is constantly stored on a sequence of capacitors. The time interval for switching from one capacitor to the next is fixed to be much smaller than the laser pulse rise time. When all the capacitors are charged, the first capacitor in the sequence is overwritten with the new amplitude voltage signals and so on. The trigger signal from the Memory 33 turns on Peak Detector/Storage 38 timing circuitry which terminates the serpentine sequence of capacitor charging in a time interval predetermined to include the signal peak. A typical number of capacitors in the sequence is 20 and a typical capacitance is 0.25 pF for each storage capacitor.

With either Peak Detector/Storage circuitry 38, the single capacitor storage or the multiple capacitor storage, the AFR leg 45 is buffered 37 to prevent feedback to the sensitive TFR leg 26. Although the amplification chain for the RTIA 28 voltage, though leg 45, including the Peak Detector/Storage 38, is not necessarily linear throughout the range of laser-generated input currents, the laser pulse amplitude can be found from the measured nonlinear relationship. Thus output of the Peak Detector/Storage 38 can be used to find the amplitude of the laser pulse.

In the main AR leg 27 the RTIA 28 voltage is amplified 35 and buffered 36 and enters 3DI-UDAR Amplitude Storage Circuitry 43. This voltage varies in time as the laser photon pulse return signals vary in time. Buffering is required to prevent signals generated in the 3DI-UDAR Amplitude Storage Circuitry 43 from feeding back to the TFR leg 26 and triggering the Memory 38. As can be seen from U.S. Pat. No. 5,446,529, FIG. 5, the 3DI-UDAR Amplitude Storage Circuitry 43 consists of a series of capacitors that are sequentially charged. The Integration Time Clock determines switching time on the capacitors by means of a high-speed shift register; a clock pulse into the shift register causes the next capacitor in the sequence to be switched to the input line. The main difference between 3DI-UDAR Amplitude Storage Circuitry 43 in this invention and the associated circuitry in U.S. Pat. No. 5,446,529 is that the storage capacitors are never reset in the current invention. In the current invention the capacitors are linked to a voltage source, the RTIA 28, rather than directly to the Detector 7 or Anode 23 which are current sources. Typical switching times can vary from 0.1 ns to 100 ns. Typically the number of storage capacitors in the 3DI-UDAR Amplitude Storage Circuitry 43 is 50 to 200.

The Delay Counter 42 determines when the capacitor charging begins. Amplitude storage could be going on all the time, as described above for the Peak Detector/Storage 38, so that amplitude information prior to the triggering of the Memory 33 is available, or capacitor charging (amplitude storage) could begin at a set time after the Memory 33 is triggered. The Delay Counter 42 is set at system start up by the Pre-load Bin Count Control 51 to stop the serpentine signal amplitude capture on the capacitors after a set time or set the time interval after the trigger of the Memory 33 at which the signal amplitude capture and storage should begin on the capacitors. When the Delay Counter 42 is set to start capacitor amplitude charging, after a certain time interval, charging is usually set to terminate when all capacitors have been charged.

After a time interval greater than the return time from the most distant target the Drive Electronics 4 begins sequencing through the laser radar processor processing-electronics unit cells 10, reading out the data. Each unit cell is selected in sequence by Row 46 and Column 47 selection pulses and the Output Amplifier 41 is turned on. The 3DI-UDAR Amplitude Storage Circuitry 43 is set for read by the Read/Write and Control 52. The Output Amplifier 41 contains one or more amplifiers (typically source followers) and switches the data storage components to their respective output lines. The Output Amplifier 41 drives the data signals to a chip output amplifier and multiplexer 12 which in turn drives the signals to the Drive and Output Electronics 4.

The first-return Peak 49 signal output from the Peak Detector/Storage 38, the first-return Range 48 output from the Analog Memory or Counter 40 and all the target-reflection, Range Bin 50 data from the 3DI-UDAR Amplitude Storage Circuitry 43 are processed by the image processing computer 4a. This data could be displayed as a 3D image or could be further processed to isolate targets. After the Drive and Output electronics 4 has processed the laser radar processor processing-electronics unit cell 10 output voltages, each unit cell 10 is reset by Drive Electronics 4 generated pulses, making this processing-electronics unit cell ready for the next laser pulse.

What is claimed is:

1. A device for imaging one or more three dimensional objects immersed in a light conducting medium comprising:
   a pulsed light source;
   means for transmitting light from said pulsed light source into said medium;
   optics for collecting light from said medium during the time for light to transit from said pulsed light source, reflect from said objects and be collected by said optics;
   a sensor means for detecting said collected light, said sensor means comprising
      means for converting said collected light into electrical charge,
      chip means comprising
         multiplexing and chip output electronics,
         a plurality of collection or detection means for collecting or detecting the electrical charge from said conversion means,
         a plurality of unit cell processing electronics including memory units for storing data related to a first return transit time for a reflected laser pulse from a target pixel, and additional memory units for storing data related to the amplitude of laser pulse reflections from one or plurality of targets, including control circuitry by which the sampling time intervals of said memory units for storing data related to the amplitude of laser pulse reflections is independently controlled, from unit cell to unit cell and including output amplifier electronics adapted to provide signals to said multiplexing and chip output electronics,
         drive electronics for providing voltages and for providing timing for said unit cell processing electronics, output amplifier electronics and said multiplexing and chip output electronics, and
      output electronics for conditioning the signals from said memory units for data processing;
      a computer for processing data from said output electronics.

2. The device for imaging one or more three dimensional objects immersed in a light conduction medium of claim 1 wherein said unit cell processing electronics, multiplexing and chip output electronics, and drive and output electronics is adapted to read out said data in real time between pulses from said light source.

3. The device for imaging one or more three dimensional objects immersed in a light conduction medium of claim 1 wherein said memory units for storing data related to a first return transit time are digital counters.

4. The device for imaging one or more three dimensional objects immersed in a light conduction medium of claim 1 wherein said memory units for storing data related to a first return transit time are capacitors.

5. The device for imaging one or more three dimensional objects immersed in a light conduction medium of claim 1 wherein said memory units for storing data related to a first return transit time are digital counters and capacitors.

6. The device for imaging one or more three dimensional objects immersed in a light conduction medium of claim 1 wherein the said data related to the first return transit time is obtained by means of disconnection from a ramp voltage.

7. The device for imaging one or more three dimensional objects immersed in a light conduction medium of claim 1 wherein the said data related to the first return transit time is obtained by means of disconnection from a series of clock pulses.

8. The device for imaging one or more three dimensional objects immersed in a light conduction medium of claim 1 wherein the said unit cell processing electronics contains a Schmitt Trigger and Memory means.

9. The device for imaging one or more three dimensional objects immersed in a light conduction medium of claim 6 wherein the said disconnection from a ramp voltage is caused by Schmitt Trigger and Memory means.

10. The device for imaging one or more three dimensional objects immersed in a light conduction medium of claim 7 wherein the said disconnection from a series of clock pulses is caused by Schmitt Trigger and Memory means.

11. The device for imaging one or more three dimensional objects immersed in a light conduction medium of claim 6 wherein the value of the said ramp voltage at disconnection is stored on a analog memory unit.

12. The device for imaging one or more three dimensional objects immersed in a light conduction medium of claim 11 wherein the said analog memory unit is a capacitor.

13. The device for imaging one or more three dimensional objects immersed in a light conduction medium of claim 7 wherein the number of said clock pulses at disconnection is stored on a digital memory unit.

14. The device for imaging one or more three dimensional objects immersed in a light conduction medium of claim 13 wherein the said digital memory unit is a pulse counter.

15. The device for imaging one or more three dimensional objects immersed in a light conduction medium of claim 1 wherein said conversion means is a solid state detector array.

16. The device for imaging one or more three dimensional objects immersed in a light conduction medium of claim 15 wherein the said solid state detector array is an array of avalanche photodiodes.

17. The device for imaging one or more three dimensional objects immersed in a light conduction medium of claim 15 wherein the said solid state detector array is a Mercury-Cadmium-Telluride detector array.

18. The device for imaging one or more three dimensional objects immersed in a light conduction medium of claim 15 wherein the said solid state detector array is a Indium-Gallium-Arsenide detector array.

19. The device for imaging one or more three dimensional objects immersed in a light conduction medium of claim 15 wherein the said solid state detector array is a silicon detector array.

20. The device for imaging one or more three dimensional objects immersed in a light conduction medium of claim 1 wherein said conversion means is a photocathode.

21. The device for imaging one or more three dimensional objects immersed in a light conduction medium of claim 1 wherein said conversion means and said chip means are contained in a vacuum tube.

22. The device for imaging one or more three dimensional objects immersed in a light conduction medium of claim 1 wherein said conversion means and said chip means are contained in a vacuum tube with an electron amplifier between them.

23. The device for imaging one or more three dimensional objects immersed in a light conduction medium of claim 22 wherein said electron amplifier is a microchannel plate.

24. The device for imaging one or more three dimensional objects immersed in a light conduction medium of claim 22 wherein said vacuum tube is situated in a magnetic field parallel to the tube axis.

25. The device for imaging one or more three dimensional objects immersed in a light conduction medium of claim 1 wherein said collection or detection means is an anode.

26. The device for imaging one or more three dimensional objects immersed in a light conduction medium of claim 1 wherein said collection or detection means is a diode.

27. The device for imaging one or more three dimensional objects immersed in a light conduction medium of claim 1 wherein said collection or detection means is a diode, a plurality of which are organized into one chip which are electrically and individually connected, by connection means, to the said unit cell processing electronics, a plurality of which are organized into a separate chip.

28. The device for imaging one or more three dimensional objects immersed in a light conduction medium of claim 1 wherein said collection or detection means is a anode, a plurality of which are organized into one chip which are electrically and individually connected, by connection means, to the said unit cell processing electronics, a plurality of which are organized into a separate chip.

29. The device for imaging one or more three dimensional objects immersed in a light conduction medium of claim 27 wherein said connection means are conducting bumps.

30. The device for imaging one or more three dimensional objects immersed in a light conduction medium of claim 1 wherein said collection or detection means is included in the said unit cell processing electronics.

31. The device for imaging one or more three dimensional objects immersed in a light conduction medium of claim 1 wherein the said unit cell processing electronics includes transimpedance amplifier means.

32. The device for imaging one or more three dimensional objects immersed in a light conduction medium of claim 1 wherein the said unit cell processing electronics includes amplifier means.

33. The device for imaging one or more three dimensional objects immersed in a light conduction medium of claim 1 wherein the said unit cell processing electronics includes filtering means.

34. The device for imaging one or more three dimensional objects immersed in a light conduction medium of claim 1 wherein the said unit cell processing electronics includes Peak Detector and Storage electronics.

35. The device for imaging one or more three dimensional objects immersed in a light conduction medium of claim 34 wherein the said Peak Detector and Storage electronics obtains the peak of the reflected laser light pulse.

36. The device for imaging one or more three dimensional objects immersed in a light conduction medium of claim 35 wherein the said peak of the reflected laser light pulse is stored on a capacitor.

37. The device for imaging one or more three dimensional objects immersed in a light conduction medium of claim 35 wherein the said Peak Detector and Storage electronics obtains and stores a time sequence of reflected laser light amplitude signals including the peak of the reflected laser light pulse.

38. The device for imaging one or more three dimensional objects immersed in a light conduction medium of claim 37 wherein the said time sequence of reflected laser amplitude signals including the peak of the reflected light signal are stored by charging a plurality of capacitors that are sequenced in time.

39. The device for imaging one or more three dimensional objects immersed in a light conduction medium of claim 38 wherein the said charging of a plurality of capacitors is sequenced in time by a shift register.

40. The device for imaging one or more three dimensional objects immersed in a light conduction medium of claim 1 wherein the said unit cell electronics includes means for terminating the information storage of said memory units after a time interval.

41. The device for imaging one or more three dimensional objects immersed in a light conduction medium of claim 1 wherein the said unit cell processing electronics contains buffers between the said memory units for storing data related to a first return transit time and the said additional memory units for storing data related to reflections from one or a plurality of targets.

42. The device for imaging one or more three dimensional objects immersed in a light conduction medium of claim 1 wherein the said additional memory units for storing data related to reflections from one or a plurality of targets are capacitors.

43. The device for imaging one or more three dimensional objects immersed in a light conduction medium of claim 42 wherein the said capacitors are sequentially charged.

44. The device for imaging one or more three dimensional objects immersed in a light conduction medium of claim 1 wherein the said unit cell electronics or the said drive electronics includes means for initiating the information storage of said memory units after a time interval and for terminating the information storage after a separate time interval.

45. The device for imaging one or more three dimensional objects immersed in a light conduction medium of claim 1, wherein said unit cell processing electronics includes switching means to turn amplifiers off during the laser interpulse period.

46. A sensor means for detecting collected light, said sensor means comprising
    means for converting collected light into electrical charge,
    chip means comprising
        multiplexing and chip output electronics,
        a plurality of collection or detection means for collecting or detecting the electrical charge from said conversion means,
        a plurality of unit cell processing electronics including memory units for storing data related to a first return transit time for a reflected laser pulse from a target pixel, and additional memory units for storing data related to the amplitude of laser pulse reflections from one or plurality of targets, including control circuitry by which the sampling time intervals of said memory units for storing data related to the amplitude of laser pulse reflections are independently controlled, from unit cell to unit cell and including output amplifier electronics adapted to provide signals to said multiplexing and chip output electronics, drive electronics for providing voltages and for providing timing for said unit cell processing electronics, output amplifier electronics and said multiplexing and chip output electronics, and output electronics for conditioning the signals from said memory units for data processing;

a computer for processing data from said output electronics.

47. The sensor means for detecting collected light of claim 46 wherein said unit cell processing electronics, multiplexing and chip output electronics, and drive and output electronics is adapted to read out said data in real time between pulses from said light source.

48. The sensor means for detecting collected light of claim 46 wherein said memory units for storing data related to a first return transit time are digital counters.

49. The device detecting collected light of claim 46 wherein said memory units for storing data related to a first return transit time are capacitors.

50. The sensor means for imaging one or more three dimensional objects immersed in a light conduction medium of claim 46 wherein said memory units for storing data related to a first return transit time are digital counters and capacitors.

51. The sensor means for detecting collected light of claim 46 wherein the said data related to the first return transit time is obtained by means of disconnection from a ramp voltage.

52. The sensor means for detecting collected light of claim 46 wherein the said data related to the first return transit time is obtained by means of disconnection from a series of clock pulses.

53. The sensor means for detecting collected light of claim 46 wherein the said unit cell processing electronics contains a Schmitt Trigger and Memory means.

54. The sensor means for detecting collected light of claim 51 wherein the said disconnection from a ramp voltage is caused by Schmitt Trigger and Memory means.

55. The sensor means for detecting collected light of claim 52 wherein the said disconnection from a series of clock pulses is caused by Schmitt Trigger and Memory means.

56. The sensor means for detecting collected light of claim 51 wherein the value of the said ramp voltage at disconnection is stored on an analog memory unit.

57. The sensor means for detecting collected light of claim 56 wherein the said analog memory unit is a capacitor.

58. The sensor means for detecting collected light of claim 52 wherein the number of said clock pulses at disconnection is stored on a digital memory unit.

59. The sensor means for detecting collected light of claim 58 wherein the said digital memory unit is a pulse counter.

60. The sensor means for detecting collected light of claim 46 wherein said conversion means is a solid state detector array.

61. The sensor means for detecting collected light of claim 60 wherein the said solid state detector array is an array of avalanche photodiodes.

62. The sensor means for detecting collected light of claim 60 wherein the said solid state detector array is a Mercury-Cadmium-Telluride detector array.

63. The sensor means for detecting collected light of claim 60 wherein the said solid state detector array is an Indium-Gallium-Arsenide detector array.

64. The sensor means for detecting collected light of claim 60 wherein the said solid state detector array is a silicon detector array.

65. The sensor means for detecting collected light of claim 46 wherein said conversion means is a photocathode.

66. The sensor means for detecting collected light of claim 46 wherein said conversion means and said chip means are contained in a vacuum tube.

67. The sensor means for detecting collected light of claim 46 wherein said conversion means and said chip means are contained in a vacuum tube with an electron amplifier between them.

68. The sensor means for detecting collected light of claim 67 wherein said electron amplifier is a microchannel plate.

69. The sensor means for detecting collected light of claim 67 wherein said vacuum tube is situated in a magnetic field parallel to the tube axis.

70. The sensor means for detecting collected light of claim 46 wherein said collection or detection means is an anode.

71. The sensor means for detecting collected light of claim 46 wherein said collection or detection means is a diode.

72. The sensor means for detecting collected light of claim 46 wherein said collection or detection means is a diode, a plurality of which are organized into one chip which are electrically and individually connected, by connection means, to the said unit cell processing electronics, a plurality of which are organized into a separate chip.

73. The sensor means for detecting collected light of claim 46 wherein said collection or detection means is a anode, a plurality of which are organized into one chip which are electrically and individually connected, by connection means, to the said unit cell processing electronics, a plurality of which are organized into a separate chip.

74. The sensor means for detecting collected light of claim 72 wherein said connection means are conducting bumps.

75. The sensor means for detecting collected light of claim 46 wherein said collection or detection means is included in the said unit cell processing electronics.

76. The sensor means for detecting collected light of claim 46 wherein the said unit cell processing electronics includes transimpedance amplifier means.

77. The sensor means for detecting collected light of claim 46 wherein the said unit cell processing electronics includes amplifier means.

78. The sensor means for detecting collected light of claim 46 wherein the said unit cell processing electronics includes filtering means.

79. The sensor means for detecting collected light of claim 46 wherein the said unit cell processing electronics includes Peak Detector and Storage electronics.

80. The sensor means for detecting collected light of claim 79 wherein the said Peak Detector and Storage electronics obtains the peak of the reflected laser light pulse.

81. The sensor means for detecting collected light of claim 80 wherein the said peak of the reflected laser light pulse is stored on a capacitor.

82. The sensor means for detecting collected light of claim 80 wherein the said Peak Detector and Storage electronics obtains and stores a time sequence of reflected laser light amplitude signals including the peak of the reflected laser light pulse.

83. The sensor means for detecting collected light of claim 81 wherein the said time sequence of reflected laser amplitude signals including the peak of the reflected light signal are stored by charging a plurality of capacitors that are sequenced in time.

84. The sensor means for detecting collected light of claim 82 wherein the said charging of a plurality of capacitors is sequenced in time by a shift register.

85. The sensor means for detecting collected light of claim 46 wherein the said unit cell electronics includes means for terminating the information storage of said memory units after a time interval.

86. The sensor means for detecting collected light of claim 46 wherein the said unit cell processing electronics contains buffers between the said memory units for storing data related to a first return transit time and the said additional memory units for storing data related to reflections from one or a plurality of targets.

87. The sensor means for detecting collected light of claim 46 wherein the said additional memory units for storing data related to reflections from one or a plurality of targets are capacitors.

88. The sensor means for detecting collected light of claim 86 wherein the said capacitors are sequentially charged.

89. The sensor means for detecting collected light of claim 46 wherein the said unit cell electronics includes means for initiating the information storage of said memory units after a time interval and for terminating the information storage after a separate time interval.

90. The sensor means for detecting collected light of claim 46, wherein said unit cell processing electronics includes switching means to turn amplifiers off during the laser interpulse period.

91. A method for imaging one or more three dimensional objects obscured by reflective or absorptive material but otherwise immersed in a light conducting medium comprising the steps of:
generating a series of pulses of light;
transmitting said light into said medium to the source of obscuration;
collecting light from said source of obscuration during the time of transmission and reflection of light from said source of obsuration;
detecting said collected light
providing timing control from said detected light
providing electrical signals from a plurality of positions on the objects beyond the source of obscuration with a single light pulse,
storing said electrical signals on a plurality of unit cells corresponding to the said plurality of positions on said objects,
providing signals from said storage means,
converting the signals stored on said storage means to a three-dimensional image of the objects.

92. A method for imaging one or more three dimensional objects obscured by reflective or absorptive material but otherwise immersed in a light conducting medium of claim 90 wherein the electrical signals correspond to a time sequence of the amplitudes of the reflected light.

93. The device for imaging one or more three dimensional objects immersed in a light conduction medium of claim 8 wherein the disconnection from a ramp voltage is caused by the said Schmitt Trigger and Memory means.

94. The device for imaging one or more three dimensional objects immersed in a light conduction medium of claim 8 wherein the disconnection from a series of clock pulses is caused by the said Schmitt Trigger and Memory means.

95. The device for imaging one or more three dimensional objects immersed in a light conduction medium of claim 28 wherein said connection means are conducting bumps.

96. The device for imaging one or more three dimensional objects immersed in a light conduction medium of claim 38 wherein the said unit cell electronics includes means for terminating the charging of said capacitors after a time interval.

97. The device for imaging one or more three dimensional objects immersed in a light conduction medium of claim 42 wherein the said unit cell electronics includes means for initiating the charging of said capacitors after a time interval and for terminating the charging after a separate time interval.

98. The sensor means for detecting collected light of claim 53 wherein disconnection from a ramp voltage is caused by the said Schmitt Trigger and Memory means.

99. The sensor means for detecting collected light of claim 53 wherein disconnection from a series of clock pulses is caused by the said Schmitt Trigger and Memory means.

100. The sensor means for detecting collected light of claim 73 wherein said connection means are conducting bumps.

101. The sensor means for detecting collected light of claim 83 wherein the said unit cell electronics includes means for terminating the charging of said capacitors after a time interval.

102. The sensor means for detecting collected light of claim 87 wherein the said unit cell electronics includes means for initiating the charging of said capacitors after a time interval and for terminating the charging after a separate time interval.

103. The device for imaging one or more three dimensional objects immersed in a light conduction medium of claim 22 wherein said electron amplifier is a diode array electrically connected to the readout array and impact ionization in the diode array is the amplification means.

104. The device for imaging one or more three dimensional objects immersed in a light conduction medium of claim 1 wherein the said unit cell and processing electronics includes digital storage means for obtaining the transit time to the target and includes means to store a time sequence of reflected laser light amplitude signals not including the peak of the reflected laser light pulse.

105. The sensor means for detecting collected light of claim 67 wherein said electron amplifier is a diode array electrically connected to the readout array and impact ionization in the diode array is the amplification means.

106. The sensor means for detecting collected light of claim 46 wherein the said unit cell and processing electronics includes digital storage means for obtaining the transit time to the target and includes means to store a time sequence of reflected laser light amplitude signals not including the peak of the reflected laser light pulse.

* * * * *